United States Patent [19]

Duke

[11] Patent Number: 4,968,328
[45] Date of Patent: Nov. 6, 1990

[54] DE-MISTER BAFFLE AND ASSEMBLY

[76] Inventor: Eddie D. Duke, P.O. Box 296, Tenaha, Tex. 75974

[21] Appl. No.: 864,298

[22] Filed: May 16, 1986

[51] Int. Cl.$^5$ .............................................. B01D 45/16
[52] U.S. Cl. ............................................ 55/1; 55/440
[58] Field of Search ...................................... 55/1, 440

[56] References Cited

U.S. PATENT DOCUMENTS

| | | | |
|---|---|---|---|
| 1,834,534 | 12/1931 | Richards et al. | 55/440 |
| 3,150,211 | 9/1964 | Murray et al. | 55/440 X |
| 3,338,035 | 8/1967 | Dinkelacker | 55/440 |
| 3,805,496 | 4/1974 | Sokolowski | 55/440 |
| 3,849,095 | 11/1974 | Regehr | 55/440 X |
| 4,141,706 | 2/1979 | Regehr | 55/440 X |
| 4,553,993 | 11/1985 | Wigley | 55/440 |
| 4,557,740 | 12/1985 | Smith | 55/440 |

FOREIGN PATENT DOCUMENTS

| | | | |
|---|---|---|---|
| 57412 | 1/1975 | Australia | 55/440 |
| 1036799 | 8/1978 | Canada | 55/440 |
| 322986 | 12/1929 | United Kingdom | 55/440 |

Primary Examiner—Kathleen J. Prunner
Attorney, Agent, or Firm—Robert S. Nisbett

[57] ABSTRACT

This invention relates to improved baffles or deflector elements for gas treating equipment wherein each element is designed with inlet and outlet sections conntected by a low pressure drop sinusoidal curved section. Each element is also provided with liquid collection and drainage channels and optionally with gas vent channels. A high strength assembly of baffles is provided by interlocking alignment and fastening apparatus using male tabs and female slots formed on each baffle element.

9 Claims, 1 Drawing Sheet

DE-MISTER BAFFLE AND ASSEMBLY

FIELD OF THE INVENTION

This invention relates to means for separating liquid droplets or mist from a gas stream by using a baffle or generally planar type impingement surface. Generally the gas is in the form of a stream flowing in a vertical or horizontal direction but it can be flowing upward, downward or in other directions. Direction of the gas stream is determined by the containing vessel and connecting conduits but is also controlled by the shape of the baffle so that the gas stream impinges on at least one surface of the baffle so that entrained liquid is thrown against the baffle surface and clings to the surface allowing the liquid to run or drain off of the surface clear of the gas stream.

BACKGROUND OF THE INVENTION

Demister separators of the impingement or baffle type are used in numerous applications in industry. Typical applications are with scrubbers for combustion processes for burning hydrocarbon fuels or carbon based fuels Such scrubbers are used to remove sulphur gases, carbon monoxide, and/or particulate material from the flue gases produced One such process and a particular type of demister is described in U.S. Pat. No. 4,028,077 to Gleason. This process uses a complex demister assembly. Another typical application is in processing or refining liquid-gas hydrocarbon systems. One such process is described in U.S. Pat. No. 1,553,973 to Ballou. Other gas-liquid systems are described in literature such as Mass-Transfer Operations by Treybal published by McGraw-Hill Book Company in 1955. Still other gas-liquid systems and demister baffles or elements are described in U.S. Pat. Nos.: 621,998 to Farley et al; 1,567,313 to Wilson et al; 2,221,989 to Mount; 3,208,204 to Per-Oskar Persson; 3,785,121 to Phelps; 3,805,496 to Sokolowski; 4,107,241 to Braun; 4,198,215 to Regehr; and 4,263,025 to Grodare. The above cited references are incorporated herein for all purposes. Such applications and the demisters or de-mister baffles described in the above references are either very crude or were designed with a complex configuration, method of manufacture or method of assembly which makes their use restricted if not prohibitive and, which makes the particular baffles too complex for general application as a simple yet efficient de-mister. The demister baffle and assembly of this application overcomes these problems and short comings.

SUMMARY OF THE INVENTION

The invention comprises at least one improvement in gas treating or a gas liquid separation apparatus. In one embodiment, it is generally a particular configuration and combination of elements for controlling the gas stream impingement on a generally planar baffle whereby the liquid droplets are attached to said baffle surface, merged into, or coalesce with a liquid film on said surface and drainage means are provided to remove the coalesed liquid from the baffle surface in a manner to reduce or prevent re-entrainment of the liquid in the gas stream. One embodiment provides a particular simple baffle configuration for efficiently removing liquid from the gas stream with very low pressure drop in the gas stream. One embodiment provides a particular simple baffle configuration for efficiently removing liquid from the gas stream with very low pressure drop in the gas stream. One embodiment provides a high strength assembly that can be easily assembled from simply formed baffles with a minimum amount of labor and skill required. These baffles and the assembly are capable of withstanding rough handling and abuse during transport, assembly, placement and operation.

Generally one embodiment of this invention provides in an apparatus for separating liquid droplets from a gas stream comprising at least two baffles arranged in an array forming channels between the baffles having a generally sinusoidal path with each baffle having a first curved surface defining the sinusoidal path and at least one attached rib which is generally perpendicular to said curved surface whereby when two baffles are arranged adjacent each other, two rib sections and the inner curved surface of one baffle form with the outer curved surface of the adjacent baffle a channel having a generally rectangular cross-section which determines or controls the path of the gas stream. A baffle characterized by said curved surface having an inlet section connected to a first sloped section which is connected to a second sloped section by a curved section and the second sloped section being connected to an outlet section. In one embodiment of the invention the outer edge of the rib section has the same general configuration as the curved or sinusoidal surface so that the rib section closely fits against the outer surface of the curved surface of the adjacent baffle thereby controlling or determining the path of said gas stream in said channel. The curved or sinusoidal surface can also have collecting channels formed therein to collect and hold separated liquid out of said gas stream. The rib section can have openings or channels therein between adjacent rectangular channels to allow gas to pass laterally along a given baffle or planar surface. Such gas vent openings are typically adjacent the first sloped section of the curved surface which would be in the higher gas pressure area of the rectangular channel and would allow the gas pressure and gas flow to equalize itself to some degree along the length of the baffle and cross-section of the baffle assembly in the containing vessel.

In a preferred embodiment the baffle is formed having at least one male tab and at least one female slot designed and located to fit together and interlock with a corresponding slot and tab respectively on an adjacent baffle so that adjacent baffles can be assembled in an array, aligned and fastened into an integral assembly using said tabs and slots. The tabs and slots can be shaped to physically interlock; they can be interlocked with a separate assembly or article; or they can be interlocked by thermal welding, solvent welding or chemical reaction welding.

DESCRIPTION OF EMBODIMENTS

Figure 1:
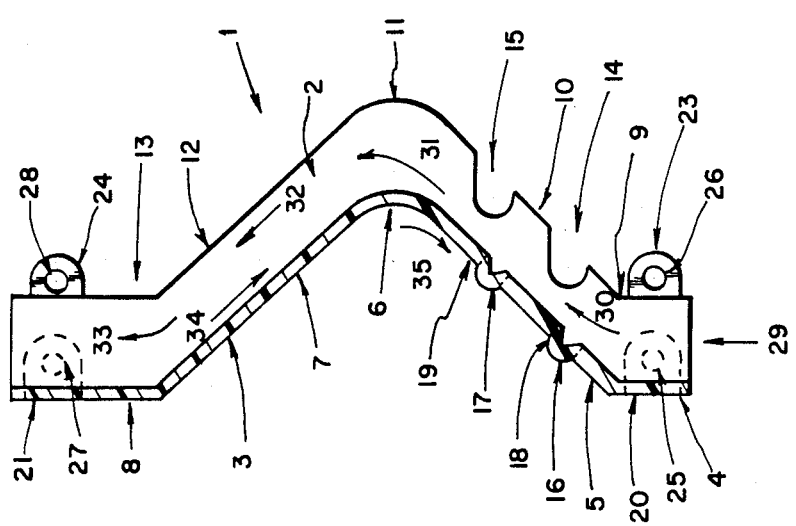
FIG. 1 is a cross section view of a single baffle such as the first baffle shown in the five member array in FIG. 2 cut along section line 22—22.

With reference to the drawings and particularly FIG. 1, the baffle or planar element is shown generally as 1 comprising curved surface 3 and rib or fin 2. The sinusoidal or curved surface and rib can be formed as one integral unit of materials such as plastic, ceramic or metal or the sections can be manufactured in parts and assembled into a completed baffle. The materials of construction, method of manufacture, method of assembly and process limitations or requirements will determine which method or methods are practical and most economical. The curved surface comprises at least five sections, inlet section 4, a first sloped section 5, a curved section 6, a second sloped section 7 and an outlet section 8. As shown each section is connected or welded to the next or formed as an integral surface with each connected to the next section. It is preferable but not absolutely required that each section form a gas tight seal or connection with the next or adjacent section, rib or surface. Likewise, the rib or fin compriSes at east five sections, inlet section 9, a first sloped section 10, a curved section 11, a second sloped section 12, and an outlet section 13. The rib is shown as an integral part of the baffle with the curved surface. This is one preferred embodiment when plastic materials and methods of manufacture are used. The plastic can be thermoplastic, thermosetting, inert or chemically reactive plastic, such as polyethylene, polypropylene, polyvinylchloride, phenol-urea type polymer, polyester, nylon, or a fluorinated polymer. In some applications it can be desirable to use ceramic materials or cast or stamped metal to form the baffle especially for high temperature or corrosive applications. The first sloped sections of the curved surface and rib 5 and 10, connected by curved sections 6 and 11 form with second sloped sections 7 and 12 the curved surface or sinusoidal surface which controls or forms the path of the gas stream indicated by 29 at the inlet.

In one embodiment of the baffle of this invention, a single baffle can be easily and quickly injection molded to form a precision baffle. Each baffle can be easily aligned and interlocked with the next baffle forming an array of the desired size. For a high strength assembly the tabs and slots of adjacent baffles can be quickly welded together, thus forming an array that can withstand the rough treatment and adverse conditions encountered during construction and operation of a chemical processing unit. One such embodiment is formed having a baffle that stands about 9 inches high and having a gas channel of about 3.5 inches to about 6 inches in length with a width of about 0.75 inches to about 2.0 inches, preferably having a cross-section of about 4.5 inches by 1.0 inch. The spacing between ribs on the curved surface and length or projection of the rib determine the dimensions of the rectangular gas channel between baffles. The gas and liquid velocities of the stream being treated will determine the optimum dimensions but the one described above is a high strength assembly. In some embodiments the angle of slope of the first sloped section, the second sloped section and any other sloped section of the baffle may not necessarily be the same angle. Again the stream velocities, process limits and pressure drop limitations will determine the number of sloped sections, the angle of slope and size of the flow channels. However, in the embodiment described above the angle of slope of each sloped section is in the range of about 30 degrees to about 65 degrees.

Figure 2:
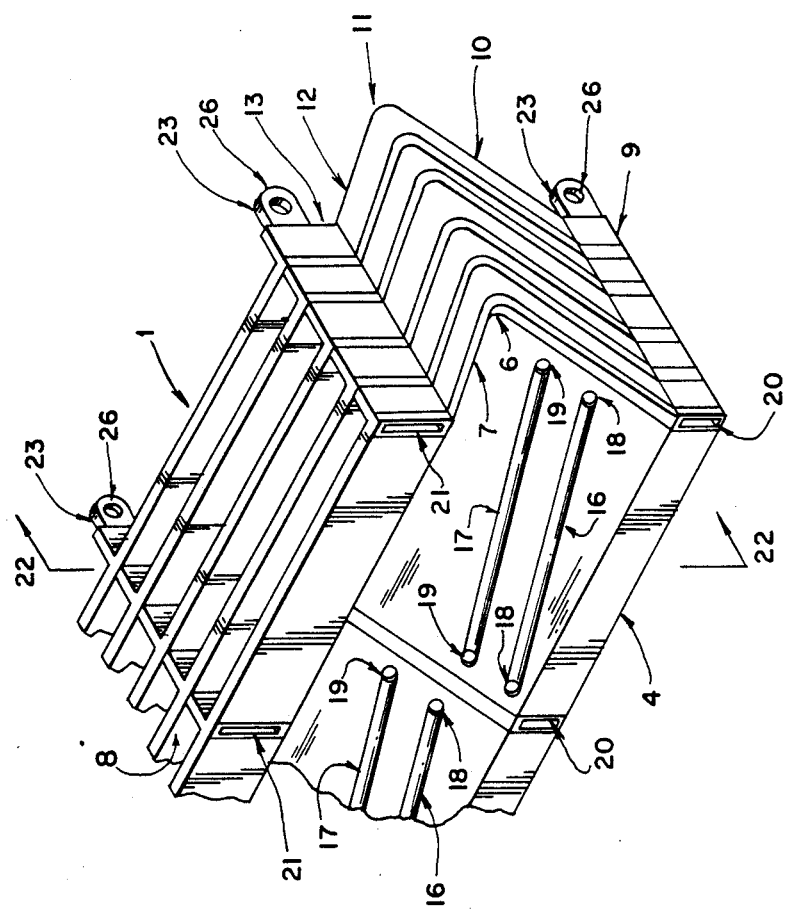
FIG. 2 is an isometric view of the end of a five member array of baffles.

FIG. 1 also shows at 16 and 17 channels formed in the planar surface or impingement surface of the first sloped section. The channels are shown as semi-circular raised surfaces on the outer surface and triangular indentations on the inner surface of the sinusoidal or curved surface. Such channels can have any one or a combination of several cross-section configurations such as being of square, triangular, or a slotted configuration. The channels as shown are straight and arranged at an angle to the axis of the gas stream, 29, so that gravity and/or the gas would promote the flow of liquid to one side or the other in the channels and on the sloped surfaces behind the raised channels. This angle can vary in the range of about 25 degrees to 45 degrees with the horizontal or about 65 degrees to 45 degrees with the axis of gas flow. The primary direction of liquid flow in and behind the channels will be a major factor in the number, size and location of liquid vent holes that are associated with each liquid channel and drainage area. Likewise, the gas velocities and primary area of liquid separation and flow will be a major factor in determining the number, size, configuration and location of the liquid drainage channels. Their size, shape, placement and configuration depends on the relative gas and liquid volumes, other properties of the gas and liquid streams and properties of the materials of construction. The channels can be designed in view of the teachings herein for the most efficient removal of liquid from the baffle surfaces and to reduce or prevent the gas stream from picking up the liquid from the baffle surface. As shown the concave channel on the inside of the sloped surface collects liquid from the flat or planar sloped surface and removes it from the area of the high velocity gas stream impinging on the surface. As shown in FIG. 2 the channels have liquid vent or drainage holes at each end shown as 18 and 19 which allow the accumulated liquid to drain from a higher pressure area or side of the sloped curved surface to a lower pressure area. Liquid vent holes may be used at only one end of each channel or more may be used as necessary. Orientation of the channels, baffles and the gas-liquid stream will determine the number and location of channels and vents. As shown in FIG. 2 the channels are disposed at an angle to the axis of gas flow through the rectangular channel so that the liquid on the surface would tend to flow from one side to the other of the rectangular channel This would cause the collected liquid to tend to flow downward at the ends or sides of the rectangular channels along the ribs or fins thereby reducing the contact between the higher velocity gas stream and the accumulated liquid stream. The channel is shown as a raised area on the outside of the sloped section which serves as a channel to direct the liquid in the lower pressure area at 35 downward and to the side of the sloped section toward liquid vent 19. Although not shown channels can also be formed in the other sections of the curved surface especially in the second sloped section, the inlet section and the outlet section and the channel can be formed with the raised portion or concaved portion on either the inside or outside of the baffle. Ideally the channels and liquid drainage or vents holes can be located to facilitate accumulation of the liquid and removal from high gas velocity areas to accelerate drainage of the liquid and minimize re-entrainment. As described herein the channels, gas stream and liquid streams have been described with the gas stream flowing upward as shown by 29 and the liquid draining downward but the elements described herein can be modified in view of the teachings set forth herein to operate with horizontal, upward, downward or oblique gas flow.

FIG. 1 shows female slots 20 and 21 which correspond to male tabs 23 and 24 respectively. As shown each baffle is formed so that the male tabs on one baffle can be used for alignment with the next adjacent baffle. The male tab as shown will fit into the female slots on the adjacent baffle. By proper sizing of the slot and tab the baffles can be easily aligned and assembled into a series or an array such as the five baffle assembly shown in FIG. 2. If the slot and tab are designed of the proper configuration and size the tab and slots can interlock with a simple friction fit. Areas 25 and 27 along with areas 26 and 28 on the slots and tabs can also be sized for an even stronger fit, for example the areas 25 and 27 in the slot can be an indented area that tightly fit expanded areas 26 and 28 on the tabs for an even tighter interlock. For maximum assembly strength these areas can be positively fastened together by placing a rod, a rivet or similar fastening means through both the slot and tab. In another embodiment the slot and tab can be welded together by thermal, sonic, chemical reaction or solvent means. In one embodiment simple thermoplastic, injection molded baffles can be welded together at the tab-slot interlock to produce joints of strength of over about 100 lbs. Likewise, the slot and tab can have many configurations such as of circular, square, conical, rectangular, T shaped, I shaped or even a more complex configuration. The method and material of construction and process limits and requirements will dictate the exact, size, configuration, number and location of tabs and slots. In one embodiment, two sets of tabs and slots are formed at each rib on the baffle, one at the top and one at the bottom of each baffle fin or rib. In some applications it will be desirable to have more than two sets in each fin; in some, it will be desirable not to have tabs and slots formed in each rib; the strength of the baffle, the material of construction, as well as the environment and manner in which it is used will determine the number and location of bonding points required between each baffle. In embodiments where more than two sloped sections and more than one curved section are used such that the baffle is higher or deeper more bonding points will be desirable and such tabs and slots can be easily fabricated at points such as the apex of the curved section such as at points 6 and 11. Furthermore the slots and tabs can be formed in either direction from the baffle and it is not necessary that they all be formed pointing in the same direction. For example, on the baffle as shown in FIG. 1 a tab could be formed at point 6 pointing in the opposite direction as those at 23 and 24 to mate with a slot formed in the rib of an adjacent baffle corresponding to point 11. In another embodiment, curved sections can be used to join the inlet and outlet sections 4 and 8 or curved sections can be used in place of the straight inlet and outlet sections to provide more impingement surface and to reduce the gas pressure drop even more.

In another embodiment, openings are provided in some ribs or fins such as in the first sloped section and especially in areas of higher gas pressure as shown at 14 and 15. These gas vents or openings allow gas from the gas stream near the inlet to flow laterally from one rectangular chamber to the adjacent chamber of lower pressure thereby helping to equalize the gas flow in each rectangular chamber and make the gas flow more uniform throughout the de-mister assembly. Such gas vents can be placed at different locations in the rib or fin members from two to eight and of various sizes to give the desired lateral gas flow and pressure equalization.

The gas stream at 29 has an axis or direction of flow across the length or planar surface of the baffles. As the gas enters the generally rectangular cross-sectioned channel at 29, the gas flows against the curved surface as shown at 30 so that entrained droplets would attach to the curved surface at 30 or be coalesed into a liquid film on the surface at about point 30. Gas flowing along the curved surface would produce on area on the opposite side of the channel corresponding to point 35 having a lower pressure or lower gas velocity. Next the gas stream would cross the gas channel as indicated at 31 and impinge on the outer side of the adjacent baffle near point 32 and create an area of lower gas velocity at about area 34. The gas stream would then cross the channel again as shown at 33 and impinge on the inside surface of the outlet area 8. Liquid coalesed on the surfaces would flow downward especially in the lower pressure areas as indicated by the arrows at 34 and 35.

Gas-liquid systems with which the baffles of this invention can be used include aqueous and non-aqueous solutions and mixtures, organic and hydrocarbon systems, those containing entrained and/or dissolved solids and gases and multi-liquid systems. The temperature, pressure and capacity of such systems can vary widely. The temperature and corrosive nature of the gas-liquid system and flow characteristics of the liquid and any associated solids will determine the materials of construction and some design features of the baffles and assembled arrays. For example, for large liquid volumes or entrained solids that can be in the liquid streams, proper design would require larger liquid flow channels and drainage vents than would otherwise be necessary to prevent clogging by solid particles. Gas-liquid systems with which the baffles of this invention are particularly useful are the aqueous-flue gas scrubbers associated with hydrocarbon or carbon based fuel combustion processes. Such systems are commonly used in power plants where aqueous scrubbers are used to remove sulfur gases, carbon monoxide and/or particulate matter from the gases produced. Such scrubbers frequently use solid or liquid reactants as part of the liquid scrubber stream which must be removed from the exit gases.

I claim:

1. In an apparatus for separating liquid droplets from a gas stream having an array of baffles arranged to form generally sinusoidal gas flow channels between adjacent baffles, wherein the improvement comprises each baffle having an inlet section connected to a first sloped section which is connected to a second sloped section by a curved section and the second sloped section is connected to an outlet section, and spaced apart ribs extending outwardly from and generally perpendicularly to a front surface of each baffle such that the ribs of one baffle form generally rectangular cross-section channels between said ribs, the front surface of said one baffle and a back surface of an adjacent baffle, wherein each rib has at least one male tab and at least one female slot designed and located such that the tab and slot of one baffle fit and interlock with the slot and tab, respectively, of an adjacent baffle so that an integral assembly of said baffle is formed.

2. The apparatus of claim 1 wherein each rectangular cross section channel has a length in the range of about 3.5 inches to about 6.0 inches and a width in the range of about 2.0 inches to about 0.75 inch.

3. The apparatus of claim 1 wherein the ribs have the same general configuration as the baffles so that the ribs of one baffle fit closely against the back surface of an adjacent baffle and each baffle has collecting channels formed therein to collect and hold separated liquid out of said gas stream.

4. The apparatus of claim 3 wherein each baffle has liquid flow channels in at least one of said sloped sections and disposed at an angle of about 45 degrees to about 65 degrees with an axis of gas flow through the gas flow channels.

5. The apparatus of claim 1 wherein the ribs have the same general configuration as the baffles so that the ribs of one baffle fit closely against the back surface of an adjacent baffle and wherein the ribs of said one baffle have openings adjacent the first sloped section of said adjacent baffle so as to allow gas to pass laterally from one rectangular channel to an adjacent rectangular channel.

6. In an apparatus for treating a gas stream by passing said stream through an array of baffles, the improvement comprising each baffle having a generally sinusoidally curved surface and spaced apart ribs extending outwardly from said curved surface wherein each rib has at least one male tab and at least one female slot designed and located such that the tab and slot of one baffle fit and interlock with the slot and tab, respectively, of an adjacent baffle so that an integral assembly of said baffles is formed.

7. A process for treating a gas stream by passing said gas stream through the array of baffles in claim 6 consisting of assembling said baffles, aligning and interlocking said baffles by using said male tabs and female slots, and forming said array so as to fit within a treatment vessel.

8. The process of claim 7 wherein the baffles are formed of thermoplastic material and the baffles are further interlocked by welding the male tabs into the female slots.

9. The apparatus of claim 6 wherein the tabs and slots are interlocked to form a baffle joint having a strength of over about 100 pounds.

* * * * *